(12) United States Patent
Capodieci

(10) Patent No.: US 8,709,517 B2
(45) Date of Patent: *Apr. 29, 2014

(54) NOVELTY SNACKS AND METHOD OF MANUFACTURE OF SAME

(71) Applicant: Creative Resonance, Inc., Glen Ellyn, IL (US)

(72) Inventor: Roberto Capodieci, Scottsdale, AZ (US)

(73) Assignee: Creative Resonance, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,038

(22) Filed: Sep. 18, 2012

(65) Prior Publication Data

US 2013/0084360 A1  Apr. 4, 2013

Related U.S. Application Data

(63) Continuation-in-part of application No. 12/193,574, filed on Aug. 18, 2008, now Pat. No. 8,268,374.

(60) Provisional application No. 61/562,901, filed on Nov. 22, 2011.

(51) Int. Cl.
*A23P 1/00* (2006.01)

(52) U.S. Cl.
USPC ............ 426/238; 426/285; 426/454; 426/512

(58) Field of Classification Search
USPC ................ 426/238, 272, 285, 512, 297, 454; 99/451, DIG. 12; 425/174.2; 119/709–711

See application file for complete search history.

(56) References Cited

U.S. PATENT DOCUMENTS

| | | | | |
|---|---|---|---|---|
| 3,812,268 A | * | 5/1974 | Corey et al. | 426/285 |
| 5,846,584 A | * | 12/1998 | Capodieci | 426/238 |
| 5,861,185 A | * | 1/1999 | Capodieci | 426/238 |
| 5,871,783 A | * | 2/1999 | Capodieci | 425/174.2 |
| 5,871,793 A | * | 2/1999 | Capodieci | 426/238 |
| 6,063,220 A | * | 5/2000 | Andersson | 156/73.1 |
| 6,068,868 A | * | 5/2000 | Capodieci | 426/238 |
| 6,379,725 B1 | * | 4/2002 | Wang et al. | 426/72 |
| 6,403,132 B1 | * | 6/2002 | Capodieci | 426/238 |
| 6,431,849 B1 | * | 8/2002 | Capodieci | 425/174.2 |
| 6,517,879 B2 | * | 2/2003 | Capodieci | 426/238 |
| 6,530,767 B1 | * | 3/2003 | Capodieci | 425/174.2 |
| 6,607,765 B2 | * | 8/2003 | Capodieci | 426/238 |
| 6,635,292 B2 | * | 10/2003 | Capodieci | 426/238 |
| 6,655,948 B2 | * | 12/2003 | Capodieci | 425/174.2 |
| 6,896,924 B2 | * | 5/2005 | Hernandez et al. | 426/623 |
| 8,389,036 B2 | * | 3/2013 | Diolaiti | 426/238 |
| 2002/0127310 A1 | * | 9/2002 | Capodieci | 426/238 |
| 2006/0105025 A1 | * | 5/2006 | Hill et al. | 424/442 |
| 2010/0040745 A1 | * | 2/2010 | Capodieci | 426/238 |
| 2010/0159086 A1 | * | 6/2010 | Diolaiti | 426/238 |

* cited by examiner

*Primary Examiner* — Steven Leff

(74) *Attorney, Agent, or Firm* — Pauley Petersen & Erickson

(57) ABSTRACT

A method for manufacturing a snack food with from a non-cohesive homogeneous blend of ingredients using an ultrasonic horn and an anvil to form an agglomerated, cohesive and portable snack without the use of additives, including but not limited to preservatives, plasticizers, binders and fluidizers.

18 Claims, 10 Drawing Sheets

NOVELTY SNACKS AND METHOD OF MANUFACTURE OF SAME

CROSS REFERENCE TO RELATED APPLICATION

This application is a continuation-in-part of U.S. Non-provisional patent application Ser. No. 12/193,574, filed on 18 Aug. 2008. This application also claims priority to or the benefit of U.S. Provisional Patent Application Ser. No. 61/562,901, filed on 22 Nov. 2011. The non-provisional application and the provisional application are hereby incorporated by reference herein in their entirety and are made a part hereof, including but not limited to those portions which specifically appear hereinafter.

BACKGROUND OF THE INVENTION

1. Field of the Invention

This invention relates generally to a method for manufacturing a novelty snack food. Specifically, this invention relates to a method of manufacturing the novelty snack food with an ultrasonic horn and an anvil and without the use of undesirable components such as plasticizers, dyes, chemicals or artificial preservatives.

2. Discussion of Related Art

Consumers, especially consumers of specialty products, such as nutraceutical, dietetic and convenience products, are increasingly demanding high-quality, snack foods made from nutritious ingredients free of additives, such as, plasicizers, dyes, chemicals or preservatives. Manufacturers in the Snack Food Industry are trying to produce products that achieve these demands while also focusing on business considerations, such as, efficiency, low-energy requirements, low asset base and small process footprint. Known methods of manufacturing snack foods are unable to meet all the demands of consumers while also meeting the needs of the business.

Currently, there are three basic manufacturing processes widely used by the Snack Food industry, namely, extrusion, oven baked (biscuit process) and Bar Line process.

The extrusion process is primarily utilized for the production of crunchy snacks or doughy, plastic, toffee-like products. Food extrusion is a process in which a food material is forced to flow, under one or more varieties of conditions of mixing, heating and shear, through a die which is designed to form and/or puff-dry the ingredients. The food extruders are a high temperature short time (HTST) device that can transform a variety of raw ingredients into intermediate and finished products. During extrusion, the cooking temperature could be as high as 180-190 C, but residence time is usually 20-40 seconds (depends on types of extruders and speed of the shaft).

On the surface, the extrusion technology appears to be very versatile since it can process a variety of food products of varied shapes, textures, appearances, etc, simply by just changing few ingredients and by minor modifications to the process conditions. Also, when compared to the other conventional processes, the extrusion process seems to be energy efficient, with a typical process load range between 0.6 and 1.6 KWh/Kg. However, the extrusion process requires a high residence time and temperatures. Additionally, the extrusion process thermally degrades many ingredients' nutritional characteristics and does not maintain the integrity of the original ingredients particulates. Delivering products that are fully homogenized and in some cases, having almost a "pre-chewed" appearance.

The oven baked process, also known as the biscuit process, entails a forming process, typically accomplished through forming rolls, in which a plastic-like dough mass is converted into individually shaped products which are subsequently oven baked in a slower, gentler heating action. However, the biscuit process takes longer to produce than other currently known methods. Moreover, this process includes a monumental asset base, foot print and energy inefficiency, where only 35% of the total oven heat is utilized by the product (with 25% of the total is used to heat and re-heat the belt and the remainder account for the typical oven losses and the heating of make-up air), make this option even less desirable.

Lastly, the Bar Line technology is the process of choice for the traditional bar shaped snacks. The Bar Line process essentially comprises an initial mixing stage in which the desired ingredients are blended together with the further addition of a binding matrix, typically loaded with sugars and fat, followed by a slab forming stage where a continuous slab of product can be made with the use of chilled rolls. The slab is subsequently cooled through a cooling tunnel prior to the slab being slit into strips and the latter being cut into the traditional bar shape. This process, in addition to requiring a complex, monumental and slow type of equipment (frequently producing significant amount of both scrap and rework) which might develop over a 200 meters of length, also entails a number of costly peripheral systems to condition (cool, heat and dry) the product before key process steps and prior to packaging with an inherently low energy efficiency. Although this process is the "most gentle" of all the conventional ones with respect to the preservation of the ingredients, it still plagued by a number of limitations.

In view of the above, a need exists for a process that can use natural ingredients from all five groups of the food pyramid to create a snack having balanced nutrition with maximum health benefits. A process of manufacture that is capable of delivering products whose nutritional profile is uncompromised by the addition of undesirable components, including fillers, plasticizers fluidizers, dyes, chemicals, artificial preservatives. There further exists a need for a process to manufacture a snack that is portable. A process that delivers a product where each ingredient is visible which contributes to the product's ultimate and unique appearance. A process that is highly versatile so as to produce items of complex shapes and textures beyond what is currently possible. A process that eliminates the need for large assets such as ovens, cooker/extruders and injection molding machines as well the need for many peripheral systems.

SUMMARY OF THE INVENTION

A general object of the invention is to provide an improved method of manufacturing novelty snacks. A more specific objective of the invention is to provide a method of manufacturing novelty snacks that uses high-quality ingredients without the use of undesirable additives, such as, fillers, plasticizers, fluidizers, dyes, chemicals and artificial preservatives.

In an embodiment of this invention, the method begins with the selection of ingredients. In a preferred embodiment, the ingredients are selected from each of the five groups of the food pyramid to create a quality, nutritionally-balanced snack with maximum health benefits. The ingredients preferably comprise dry, low-moisture, shelf-stable ingredients in a variety of particulate forms, including, for example, granules, flakes, dice, splits, powders, etc. Additionally, the ingredients may further include functional ingredients, such as, probiotics, amino acids, fiber, antioxidants, and herbal supplements. The ingredients are blended together in suitable proportions and subjected to a gentle spray or atomization of moisture to lightly coat the outer surface of the various particulates and to create a homogeneous blend of ingredients. In an alternative embodiment, at least one of the ingredients is selected to provide adequate moisture for all of the ingredients when mixed negating or minimizing the need for the gentle spray or atomization of moisture.

After obtaining the homogeneous blend of ingredients, a suitable volume of the combined, non-cohesive ingredients, known as a charge, is placed into a sleeve having a forming chamber which will provide lateral containment to the charge. The charge is then compressed between an inert anvil punch and an ultrasonically energizable tool by means of an actuator. The ultrasonically energizable tool is then injected with a commensurate amount of energy. Vibrations, acting on the moisture uniformly distributed throughout the charge, transform the moisture at points of contact between particulates into steam. In turn, the steam causes proteins in the charge to coagulate, starches to gelatinize, sugars to caramelize and the Maillard reaction to occur, ultimately agglomerating the particulates into a unified, cohesive product. The resulting product is a three-dimensional shaped product, with variable-density, in which each ingredient is visible in its original particulate form and contributes to the product's unique appearance.

This process is inherently gentle, preserving heat-sensitive ingredients, allowing the nutritional profile to be established through the selection of ingredients and their nutritional components (amino acids, vitamins, minerals, etc.), eliminating the need to fortify or enrich the product, as required by previously known methods. This process also provides a shelf-stable product that is pasteurized by the injection of sonic energy.

This process also provides benefits to business by eliminating the need for large assets such as ovens, cookers, extruders, cooling tunnels, etc, as well the need for many peripheral systems. This invention also provides space-savings, the apparatus is compact, with space requirements that are a small fraction of current technologies. The apparatus may also be portable and easy to deploy, needing only "one socket and one faucet."

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

The method for manufacturing novelty snacks according to this invention is based on an ultrasonic rapid agglomeration technology. The method of this invention utilizes natural ingredients to provide a low-volume, variable density product without compromising palatability, texture, shelf life and nutrition by the addition of undesirable components such as fillers, plasticizers fluidizers, fat binding matrices, dyes, chemicals and artificial preservatives.

Figure 1:
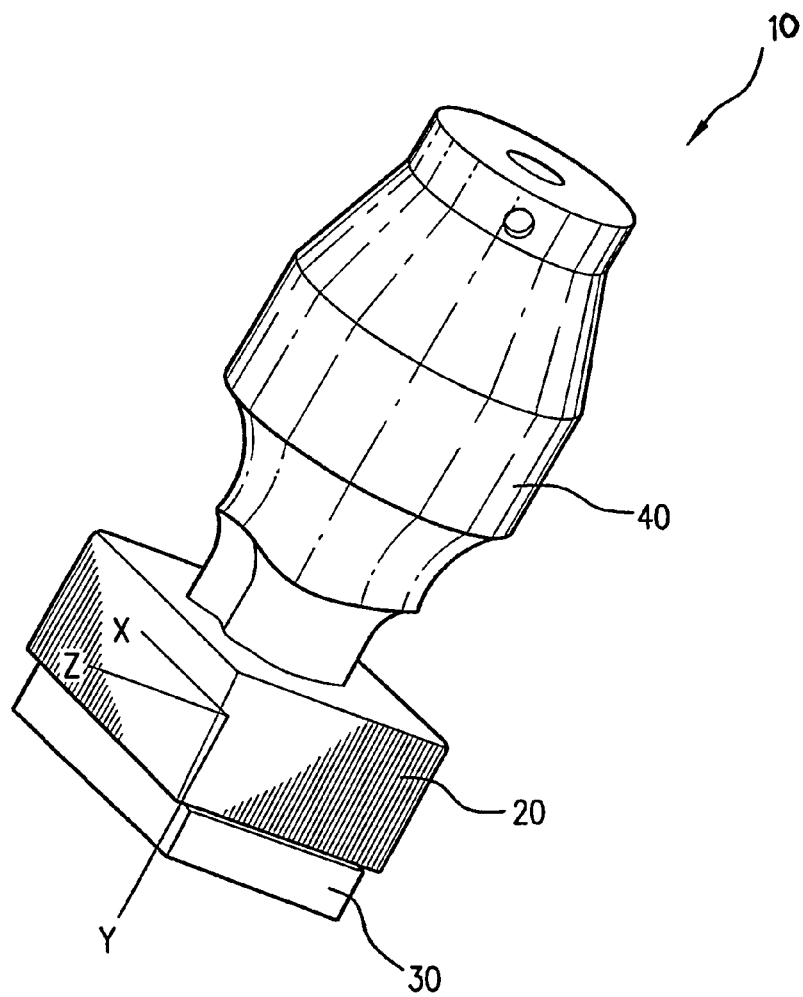
FIG. 1 is a perspective view of an apparatus for manufacturing novelty snacks according to one embodiment of this invention.

FIG. 1 shows a perspective view of an embodiment of an apparatus 10 for manufacture of novelty snacks. The apparatus 10 includes a sleeve 20, an anvil 30, and an ultrasonic horn 40. The ultrasonic horn 40 is preferably a part of an ultrasonic stack that includes a converter (not shown) through a booster (not shown). The ultrasonic stack receives energy from an ultrasonic power supply (not shown) by means of a radio frequency cable (not shown).

Figure 2:
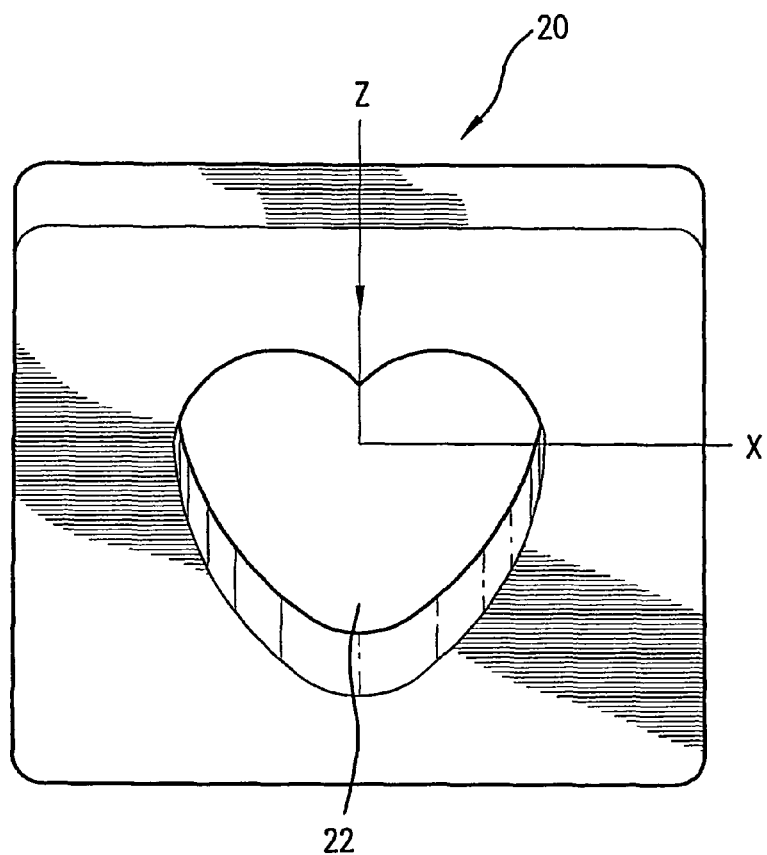
FIG. 2 is a perspective view of a sleeve according to an embodiment of this invention.

FIG. 2 is a perspective view of the sleeve 20 without the other components of the apparatus 10. The sleeve 20 includes a forming chamber 22. The forming chamber 22 in this embodiment is heart-shaped. However, the forming chamber 22 is not limited to this shape and may comprise any shape. The sleeve 20 is preferably removable from the apparatus 10, after the process cycle is complete, to improve access to and discharge of a finished product. In a preferred embodiment, the sleeve 20 is one sleeve of a plurality of sleeves that may be used with the apparatus 10 to form the finished product. Each of the plurality of sleeves preferably provides different characteristics to the finished product, for example, different product densities, sizes and shapes.

Figure 3:
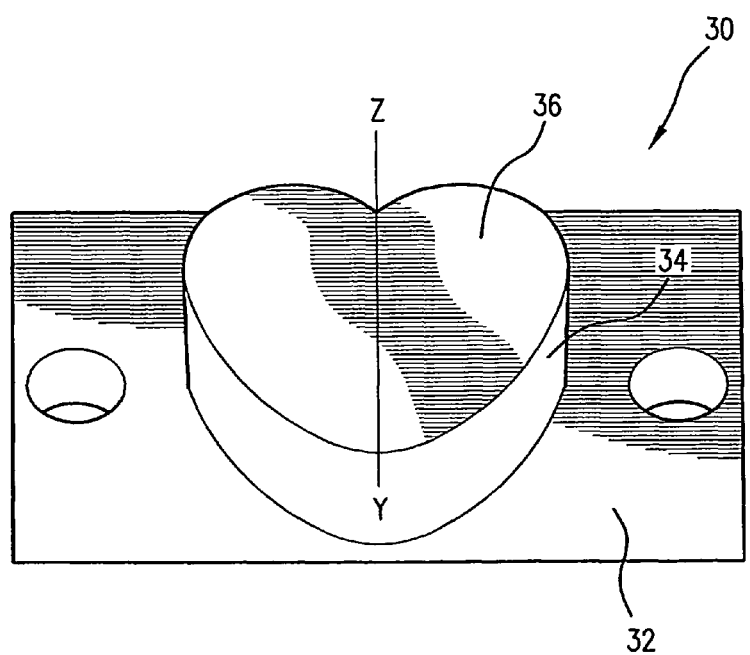
FIG. 3 is a perspective view of an anvil according to an embodiment of this invention.
Figure 3A:
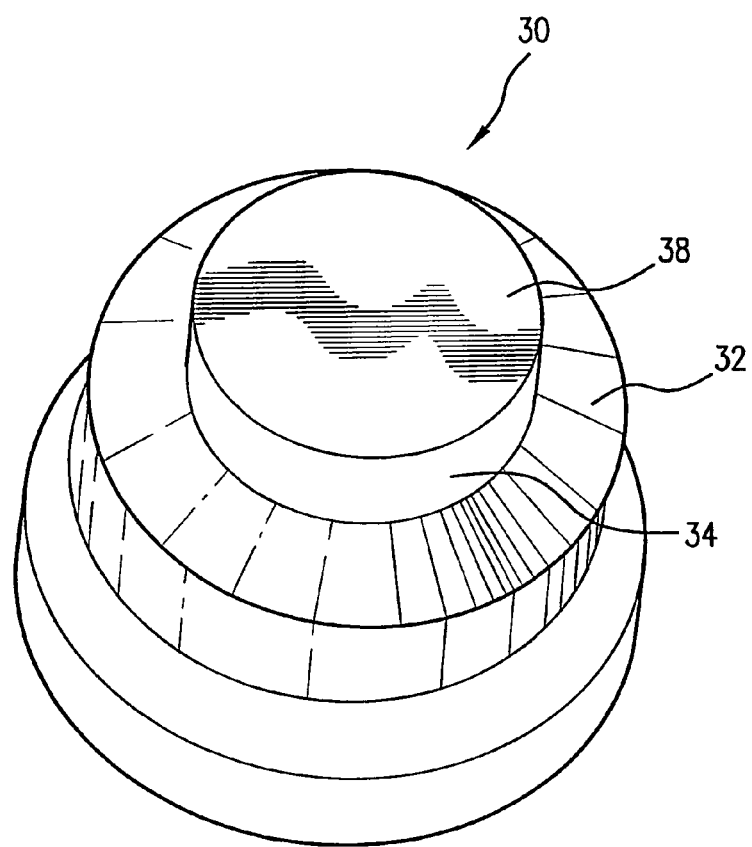
FIG. 3A is a perspective view of an anvil according to an another embodiment of this invention.

FIG. 3 shows a perspective view of the anvil 30 shown in FIG. 1. The anvil 30 includes an anvil base 32, an anvil plug 34 and a punch surface 36. The anvil plug 34 can be stationary in one embodiment. In another embodiment, the anvil plug 34 can be directly movable or indirectly by actuating the anvil 30 (both by means not shown here) to penetrate the forming chamber 22 of the sleeve 20 to exert the desired compressive force on a charge of ingredients. In this embodiment, the punch surface 36 is concave and heart-shaped. However, the punch surface 36 may include any surface features, such as, a flat surface, a convex surface, a concave surface and/or complex surfaces features to create a snack food of any shape including, but not limited to, geometrical shapes, complex 3-D shapes and any logo. Shown in FIG. 3A, is an anvil plug 34 with a flat punch surface 38. In an alternative embodiment, the punch surface may also include a relief to impart details, indented or embossed, into a finished product, such as, but not limited to, lettering and logos.

According to an embodiment of this invention, the anvil plug 34 may comprise an acoustic tool to provide energy to the charge. In such a manner the anvil plug 34 may cooperate with the ultrasonic horn 40 to inject energy to the charge of ingredients, in a simultaneous or sequential manner. In addition, one or both of the anvil plug 34 and/or the ultrasonic horn 40 may be heated to assist in creating a product having a cooked appearance. According to one preferred embodiment of this invention, the anvil plug 34 may be heated to a temperature of approximately 70 degrees F. as the anvil plug 34 is engaged with the ultrasonic horn 40.

Figure 4:
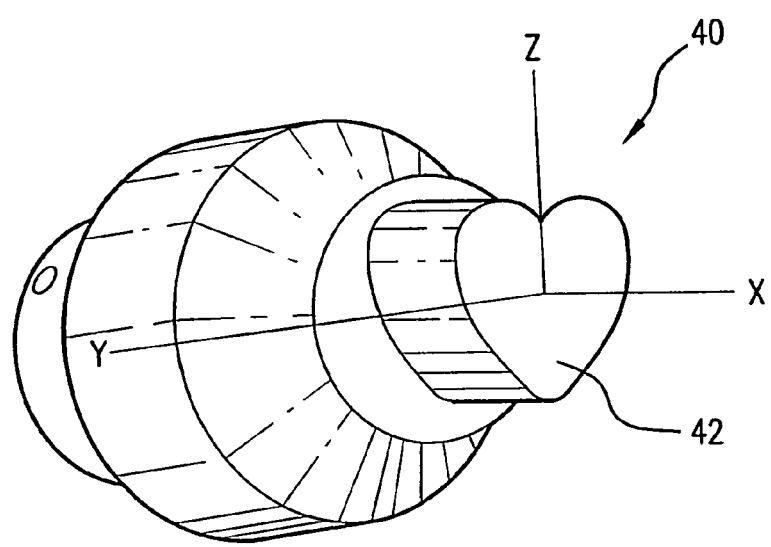
FIG. 4 is a perspective view of an ultrasonic horn according to an embodiment of this invention.

FIG. 4 shows a perspective view of the ultrasonic horn 40 shown in FIG. 1. In this embodiment, the ultrasonic horn 40 includes a concave, heart-shaped forming surface 42. However, the ultrasonic horn 40 may include a forming surface 42 with flat, convex, concave and/or complex surfaces features to form a finished product with any shape including, but not limited to, any geometrical shape, any character and any logo. In an alternative embodiment, the forming surface 42 may also include a relief to impart details, indented or embossed, into a finished product, such as, but not limited to, lettering and logos.

Figure 5:
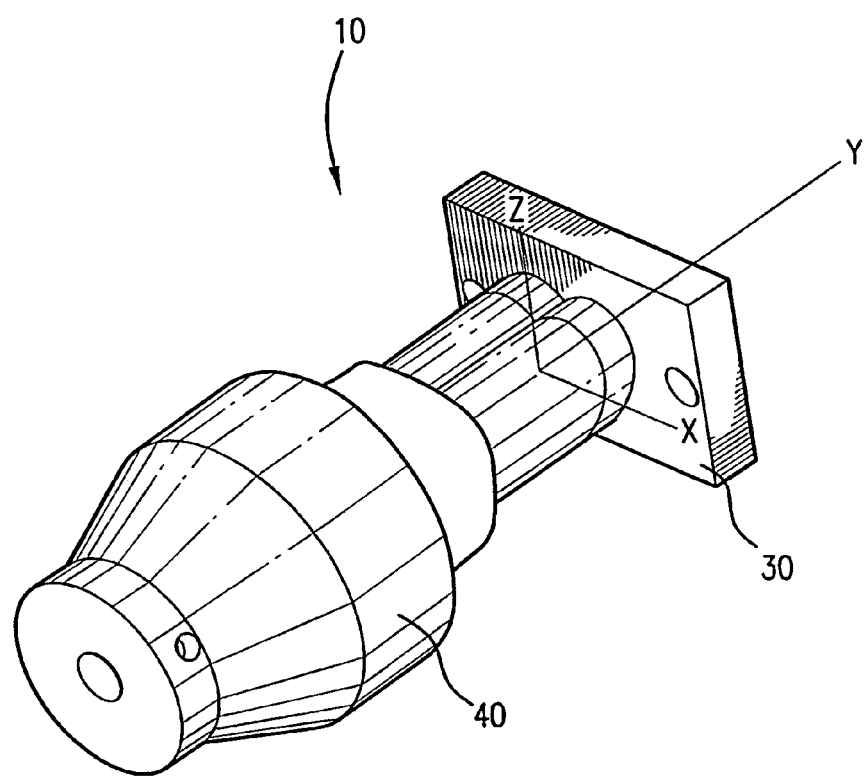
FIG. 5 is a perspective view of an apparatus for manufacturing novelty snacks according to an embodiment of this invention.

FIG. 5 shows a perspective view of the ultrasonic horn 40 and the anvil 30 in their respective positions at the end of the forming process without the sleeve 20.

The method for manufacturing novelty snacks according to this invention includes a mixing process, in either form, batch or continuous, fed by metering system, manual or automatic, that will deliver a formula's ingredients in the proper quantities and in a suitable sequence. In a preferred embodiment, the ingredients are dry ingredients selected, in suitable portions, from each of the five food groups to provide proper nutrition and flavor. The ingredients may be chosen to provide a specific nutritional profile, such as, high protein, low fat, high fiber, and low calorie. The chosen dry ingredients may come in a variety of particulate forms and sizes, including, but not limited to, flakes, granules, powders, kernels, dice, splits, grated, ground and chopped. In an alternative embodiment, the ingredients may further include functional ingredients, such as, but not limited to, probiotics, amino acids, fiber, antioxidants, and herbal supplements, in order to provide additional benefits, such as, improve stamina and endurance, hasten recovery, heighten alertness and mental acuity.

In a preferred embodiment, the ingredients are then mixed with water, such as atomized water, to coat the surface of the various particulates in order to bring the mix to a homogenous blend with a desired moisture level. Alternatively, another liquid, such as a sugar solution, a fruit juice and glycerin may be used to bring the mix of ingredients to the desired moisture level. In another alternative embodiment, rather than adding water, the mix is moistened through the use, in congruent percentages, of wet ingredients including, but not limited to, wet vegetable or fruit pomaces, pulps, grated cheese, cheese powder and meats. According to this invention the desired moisture level ranges from 2 to 20% by weight and preferably in a range from 2 to 15% by weight, to provide the finished product with a desired appearance, texture, mouth feel and palatability. In addition to blending the ingredients and distributing the moisture uniformly, the mix creates a non-cohesive, loose and flowable mix to facilitate the subsequent dosing operation.

The mix of ingredients is then transferred, by conventional means, into a feed hopper and will be dosed, congruent with the shape and weight of the finished product, into a charge and deposited into the forming chamber 22 which will provide lateral containment to the charge. The charge is then compressed between the anvil plug 32 and the ultrasonic horn 40 by means of an actuator to a pressure rate ranging from 10 to 200 kg/cm$^2$, and preferably ranging from 15 to 100 kg/cm$^2$, depending on the desired texture, density and hardness of the finished product. Note, that such pressure values are immensely lower than those typically needed in pressure forming and injection molding systems which can easily exceed 5,000 kg/cm$^2$. This allows for a more nimble, streamlined and less monumental process equipment and machinery.

Finally, the ultrasonic horn 40 is energized to provide desired product attributes, such as, texture, density, flavor and shape. By superimposing the static compressive force and a rapidly alternating compressive force from a face of the ultrasonic horn vibrating at a resonant frequency, energy is delivered directly into product molecules as they are being vibrated at the same resonant frequency. This vibration, acting on the moisture uniformly distributed throughout the charge, will transform the moisture at points of contact between particulates into steam, causing the proteins to coagulate, the starches to gelatinize and sugars to caramelize, and ultimately agglomerating the charge into a unified product with a desired shape. The ultrasonic horn 40 is typically energized for a dwell time between 100 milliseconds to 750 milliseconds at a resonant frequency range of 15 to 40 kHz. This short cycle time ensures that any heat sensitive ingredient is preserved and allows for a high production capacity and low process loads. Energy level for this application range from 15 J/g to 100 J/g and a corresponding process load of 0.004 kWh/kg to 0.027 kWh/kg. These energy levels and process loads are unheard within the industry and unachievable by conventional technologies. In another embodiment, the agglomerated product can be subjected to a drying process step to remove any additional moisture.

This combination of compressive force and total energy injection, will determine the ultimate texture and hardness of the finished product. By manipulating the process parameters that preside over the energy injection (for example, time, amplitude, and compressive force) it is possible to ensure that energy can be transferred uniformly throughout the product mass. Also note that while the compressive force, amplitude and dwell time will establish the total energy injected into the product. The actuator speed will determine the rate at which the energy will be injected.

Figure 6:
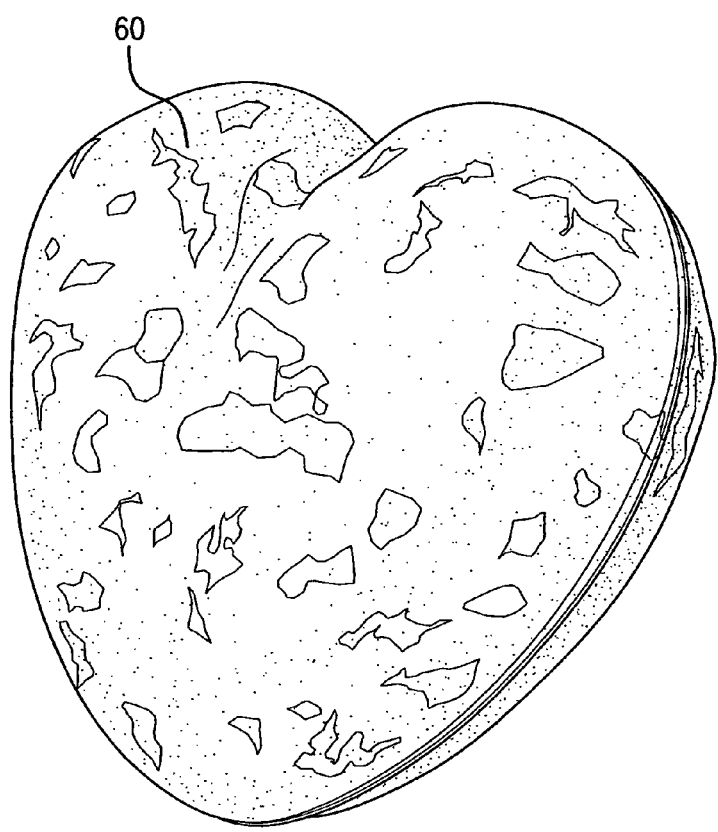
FIG. 6 is a perspective view of a finished product according to one embodiment.
Figure 7:
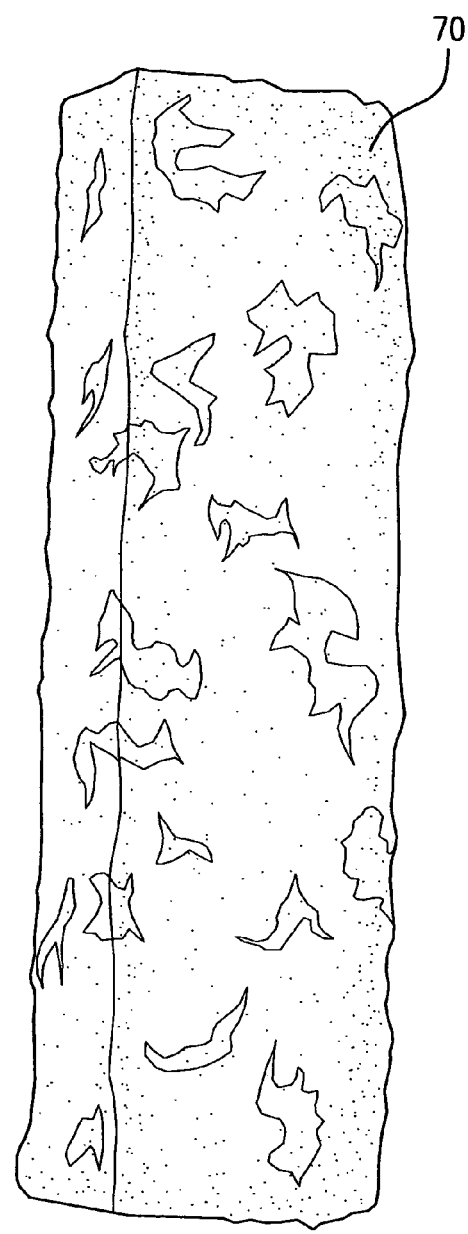
FIG. 7 is a perspective view of a finished product according to another embodiment.
Figure 8:
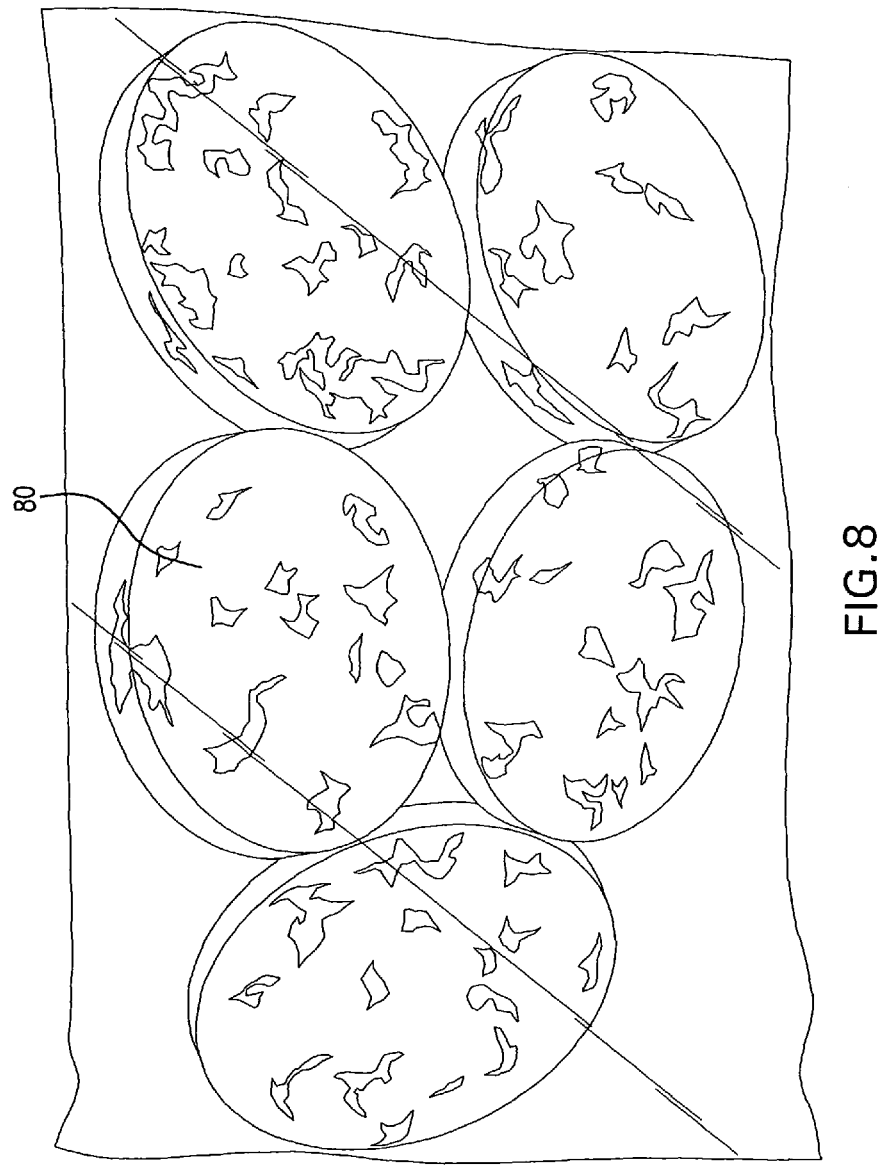
FIG. 8 is a perspective view of a finished product according to another embodiment.
Figure 9:
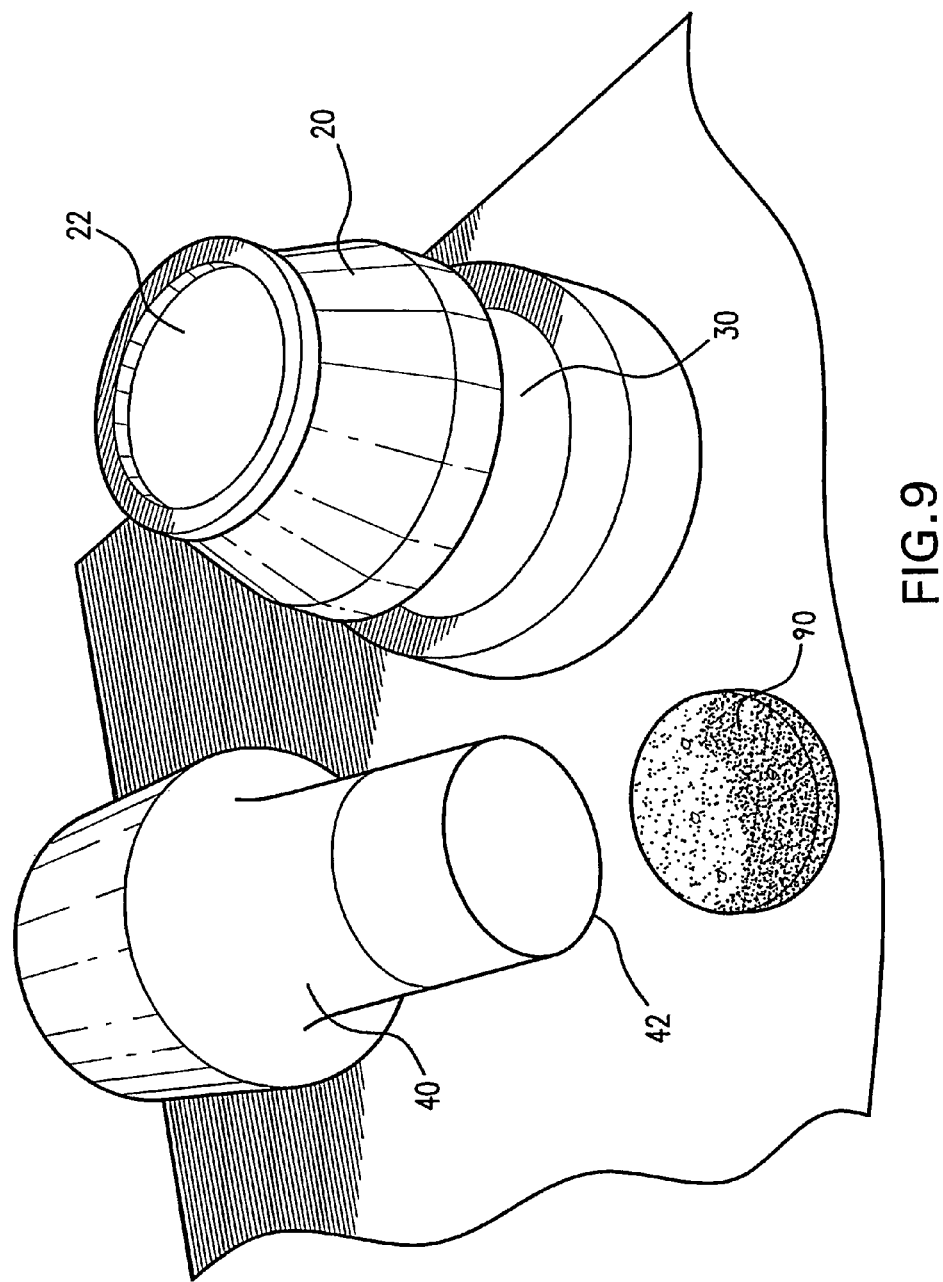
FIG. 9 is a perspective view of a finished product according to another embodiment with an apparatus for manufacturing novelty snacks according to an embodiment of this invention.

FIG. 6 shows a photograph of a finished product 60 in a heart-shaped form according to one embodiment of this invention. FIG. 7 shows a photograph of a finished product 70 in a bar-shaped form according to another embodiment of this invention. FIG. 8 shows a photograph of a finished product 80 in a disk-shaped form according to another embodiment of this invention. FIG. 9 shows a photograph of a finished product 90 according to another embodiment with the anvil 30, the sleeve 20 and the ultrasonic horn 40.

According to a preferred embodiment of this invention, the subject invention does not result in any scrap, rework or edge trim, since the entire moistened charge is converted into the finished product without any product loss.

Various examples of formulas for manufacturing the novelty snack of this invention will now follow. Please note that these formulas are possible examples and are no way limiting to the possible formulas that may be utilized to manufacture snack foods according to this invention.

TABLE 1

| | High Protein Granolas | | | | | | | | | |
|---|---|---|---|---|---|---|---|---|---|---|
| | 1 | | 2 | | 3 | | 4 | | 5 | |
| | Grams | | | | | | | | | |
| | 150 | | 150 | | 150 | | 150 | | 150 | |
| | Total Protein % | | | | | | | | | |
| | 16% | | 16% | | 20% | | 21% | | 24% | |
| Ingredients | % | g | % | g | % | g | % | g | % | g |
| Granola Blend I (Oats, Raisins, Almonds & Honey) | 70 | 105 | | | | | | | | |
| Granola Blend II | | | | | | | 50 | 75 | 50 | 75 |
| Granola Blend III | | | 60 | 90 | 50 | 75 | | | | |

TABLE 1-continued

| | High Protein Granolas | | | | | | | | | |
|---|---|---|---|---|---|---|---|---|---|---|
| | 1 | | 2 | | 3 | | 4 | | 5 | |
| | Grams | | | | | | | | | |
| | 150 | | 150 | | 150 | | 150 | | 150 | |
| | Total Protein % | | | | | | | | | |
| | 16% | | 16% | | 20% | | 21% | | 24% | |
| Ingredients | % | g | % | g | % | g | % | g | % | g |
| Whey protein concentrate (75% Protein) | 15 | 22.5 | 15 | 22.5 | 20 | 30 | 10 | 15 | 20 | 30 |
| Soy Protein concentrate (86.67% protein) | 5 | 7.5 | 5 | 7.5 | 5 | 7.5 | 15 | 22.5 | 10 | 15 |
| Partially Hidrolized Guar Gum Fiber (80% Soluble Fiber) | 10 | 15 | 10 | 15 | 5 | 7.5 | 5 | 7.5 | | |
| Psyllium Husk (83.3% dietary Fiber) | | | | | | | 5 | 7.5 | | |
| Infused Cranberries | | | 10 | 15 | 20 | 30 | | | | |
| Candied dried Kiwi | | | | | | | 15 | 22.5 | | |
| Dried apricot | | | | | | | | | 20 | 30 |
| Candied dried pineapple | | | | | | | | | | |
| | 100 | 150 | 100 | 150 | 100 | 150 | 100 | 150 | 100 | 150 |
| | 25 G Water | | 20 G Water | | 22 G Water | | 25 G Water | | 25 G Water | |

TABLE 2

| | High Protein Snacks | | | | | | | | | |
|---|---|---|---|---|---|---|---|---|---|---|
| | 1 | | 2 | | 3 | | 4 | | 5 | |
| | Grams | | | | | | | | | |
| | 150 | | 150 | | 150 | | 150 | | 150 | |
| | Total Protein % | | | | | | | | | |
| | 39% | | 16% | | 16% | | 20% | | 28% | |
| Ingredients | % | g | % | g | % | g | % | g | % | g |
| Dry Beef | 70 | 105 | 35.1 | 52.65 | 34 | 51 | | | | |
| Peperami (BIFI) Classic | | | | | | | | | | |
| Peperami (BIFI) Hot | | | | | | | 63 | 94.5 | 60 | 90 |
| Gouda Cheese | | | | | | | | | 20 | 30 |
| Monterey Jack Cheese | | | | | | | | | | |
| Potato Starch | 10 | 15 | | | | | | | | |
| Pinto Beans Powder | | | | | 33 | 49.5 | | | | |
| Lentil flakes | | | 28.5 | 42.75 | | | | | | |
| Sweet potato granules | | | 20.5 | 30.75 | 33 | 49.5 | | | | |
| Onion Powder | | | 12.4 | 18.6 | | | | | | |
| Inulin | | | 3.5 | 5.25 | | | | | | |
| Soy Protein (texturized, powder) | 20 | 30 | | | | | | | 10 | 15 |
| Extruded corn flour Pita Chips | | | | | | | | | | |
| Water Cracker | | | | | | | 37 | 55.5 | 10 | 15 |
| Totals | 100 | 150 | 100 | 150 | 100 | 150 | 100 | 150 | 100 | 150 |
| | 4.5 G Water | | 5 G Water | | 2.7 G Water | | 3.7 G Water | | 3.4 G Water | |

TABLE 2-continued

| | High Protein Snacks | | | | | | | | | |
|---|---|---|---|---|---|---|---|---|---|---|
| | 6 | | 7 | | 8 | | 9 | | 10 | |
| | Grams | | | | | | | | | |
| | 150 | | 150 | | 150 | | 150 | | 150 | |
| | Total Protein % | | | | | | | | | |
| | 13% | | 10% | | 21% | | 24% | | 17% | |
| Ingredients | % | g | % | g | % | g | % | g | % | g |
| Dry Beef | | | | | | | 45 | 67.5 | | |
| Peperami (BIFI) Classic | | | | | 35 | 52.5 | | | | |
| Peperami (BIFI) Hot | 35 | 52.5 | | | | | | | 35 | 52.5 |
| Gouda Cheese | | | | | 20 | 30 | | | | |
| Monterey Jack Cheese | 10 | 15 | 30 | 45 | | | | | | |
| Potato Starch | | | | | | | | | | |
| Pinto Beans Powder | | | | | | | | | | |
| Lentil flakes | | | | | | | | | | |
| Sweet potato granules | | | | | | | | | | |
| Onion Powder | | | | | | | | | 5 | 7.5 |
| Inulin | | | | | 5 | 7.5 | | | | |
| Soy Protein (texturized, powder) | | | 10 | 15 | 10 | 15 | 10 | 15 | 15 | 22.5 |
| Extruded corn flour | | | 60 | 90 | | | | | 45 | 67.5 |
| Pita Chips | 55 | 82.5 | | | | | 45 | 67.5 | | |
| Water Cracker | | | | | 30 | 45 | | | | |
| Totals | 100 | 150 | 100 | 150 | 100 | 150 | 100 | 150 | 100 | 150 |
| | 3.4 G Water | | 3.4 G Water | | 3.4 G Water | | 3.4 G Water | | 3.4 G Water | |

TABLE 3

| | Innovative Marzipans | | | | | | | | | |
|---|---|---|---|---|---|---|---|---|---|---|
| | 1 | | 2 | | 3 | | 4 | | 5 | |
| | Grams | | | | | | | | | |
| | 150 | | 150 | | 150 | | 150 | | 150 | |
| Ingredients | % | g | % | g | % | g | % | g | % | g |
| Ground Peanut | 40 | 60 | 28 | 42 | 28 | 42 | 28 | 42 | 24 | 36 |
| Chopped Peanut | 10 | 15 | 7 | 10.5 | 7 | 10.5 | 7 | 10.5 | 6 | 9 |
| Confectionery sugar | 50 | 75 | 35 | 52.5 | 35 | 52.5 | 35 | 52.5 | 30 | 45 |
| Dark Chocolate Morsels | | | 15 | 22.5 | | | | | | |
| Golos (Tejocote-mexican fruit- and Tamarind paste with chilli powder & salt) | | | | | | | | | | |
| Dried Infussed Cranberries | | | | | 10 | 15 | | | | |
| Colored Sugar little pieces (different shapes) | | | | | | | | | | |
| Raisins | | | | | | | 10 | 15 | 5 | 7.5 |
| Classic Granola HEB | | | | | | | | | 25 | 37.5 |
| Inulin | | | 10 | 15 | | | | | | |
| Soy Protein (38% protein texturized, powder) | | | 5 | 7.5 | | | | | | |
| Soy Protein Concetrate (86.67% protein) | | | | | 15 | 22.5 | 15 | 22.5 | 10 | 15 |
| Partially Hidrolized Guar Gum Fiber (80% Soluble Fiber) | | | | | | | 5 | 7.5 | | |

TABLE 3-continued

| Psyllium Husk (83.3% dietary Fiber) | | | | | 5 | 7.5 | | | | |
|---|---|---|---|---|---|---|---|---|---|---|
| | 100 | 150 | 100 | 150 | 100 | 150 | 100 | 150 | 100 | 150 |

| | Innovative Marzipans | | | | | | | | | |
|---|---|---|---|---|---|---|---|---|---|---|
| | 6 | | 7 | | 8 | | 9 | | 10 | |
| | | | | | Grams | | | | | |
| | 150 | | 150 | | 150 | | 150 | | 150 | |
| Ingredients | % | g | % | g | % | g | % | g | % | g |
| Ground Peanut | 28 | 42 | 34 | 51 | 34 | 51 | 34 | 51 | 34 | 51 |
| Chopped Peanut | 7 | 10.5 | 8.5 | 12.8 | 8.5 | 12.8 | 8.5 | 12.8 | 8.5 | 12.8 |
| Confectionery sugar | 35 | 52.5 | 42.5 | 63.8 | 42.5 | 63.8 | 42.5 | 63.8 | 42.5 | 63.8 |
| Dark Chocolate Morsels | | | | | 15 | 22.5 | | | | |
| Golos (Tejocote-mexican fruit- and Tamarind paste with chilli powder & salt) | | | | | | | 15 | 22.5 | | |
| Dried Infussed Cranberries | | | | | | | | | | |
| Colored Sugar little pieces (different shapes) | | | | | | | | | 10 | 15 |
| Raisins | | | | | | | | | | |
| Classic Granola HEB | | | | | | | | | | |
| Inulin | | | | | | | | | 5 | 7.5 |
| Soy Protein (38% protein texturized, powder) | | | | | | | | | | |
| Soy Protein Concetrate (86.67% protein) | 13 | 19.5 | | | | | | | | |
| Partially Hidrolized Guar Gum Fiber (80% Soluble Fiber) | | | | | | | | | | |
| Psyllium Husk (83.3% dietary Fiber) | | | | | | | | | | |
| | 83 | 125 | 85 | 128 | 100 | 150 | 100 | 150 | 100 | 150 |

TABLE 4

| Pizza Snack | W (g) |
|---|---|
| Pita Chips | 50 |
| Parmesan Cheese | 25 |
| Oregano | 0.5 |
| Tomato Granules | 10 |
| Added Water | |

TABLE 5

| Vegetables & Beef 1 | W (g) |
|---|---|
| Beets Powder | 40 |
| Beets Granules | 35 |
| Sweet Potato Gran | 50 |
| Tomato Granules | 25 |
| Beef Jerky Diced | 25 |
| Added Water | 7 |

TABLE 6

| Pita chips & Beef | W (g) |
|---|---|
| Pita Chips | 100 |
| Sw Potato Powder | 20 |

TABLE 6-continued

| Pita chips & Beef | W (g) |
|---|---|
| Sw Potato Granules | 20 |
| Pea Protein Powder | 15 |
| Tomato Granules | 20 |
| Beef Jerky Diced | 50 |
| Chili Seasoning | 2 |
| Added Water | 12 |

TABLE 7

| Panforte | W (g) |
|---|---|
| Candied Fruit | 400 |
| Nuts Mix | 200 |
| Lemon Rind | 2 |
| Orange Rind | 4 |
| Nutmeg | 2 |
| Cloves | 1 |
| Brown Sugar | 60 |
| Honey Powder | 60 |
| Vanillin Powder | 1 |
| Flour | 10 |
| Inulin | 40 |

TABLE 8

| Fruit Bar | W (g) |
| --- | --- |
| Almond Slices | 50 |
| Candied Pineapple | 160 |
| Date Granules | 100 |
| Infused Apple Dice | 75 |
| Sw Potato Granules | 75 |
| Coconut Flakes | 40 |
| Apple Powder | 15 |
| Honey Powder | 20 |
| Vanillin Powder | 1 |
| Added Water | 25 |
| Glycerin | 5 |

TABLE 9

| Vegetable Bar | W (g) |
| --- | --- |
| Vegetable Mix | 200 |
| Chicken Bullion Gran | 2.5 |
| Parmesan Cheese | 25 |
| Added Water | 4 |

TABLE 10

| Vegetable & Beef 2 | W (g) |
| --- | --- |
| Vegetable Mix | 200 |
| Sw Potato Granules | 30 |
| Chili Seasoning | 4 |
| Beef Jerky Diced | 50 |
| Added Water | 3.5 |

Thus, the invention provides a method for manufacturing novelty snacks. Specifically, this invention provides a method of manufacturing novelty snacks with an ultrasonic horn and an anvil to provide a nutritious product with a long shelf life, without undesirable components such as plasticizers, dyes, chemicals or artificial preservatives. Furthermore, this invention provides benefits to a business by improving manufacturing and production efficiencies over previously known methods.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for producing a snack comprising:
providing ingredients selected from food groups consisting of vegetable group, fruit group, dairy group and protein group and having a variety of particulate forms and sizes;
mixing the ingredients with a liquid to a homogeneous blend to create a non-cohesive loose mix of ingredients having a desired moisture content ranging from 6% to 20% by weight, wherein the liquid comprises at least one of water, a sugar solution, a fruit juice, and glycerin;
depositing a metered amount of a charge of the non-cohesive loose mix of ingredients into a sleeve;
compressing the charge of ingredients between an anvil plug of an anvil and a face of an ultrasonic horn; and
energizing the ultrasonic horn to cause the charge to be agglomerated into a desired shape having a different density from the non-cohesive loose mix of ingredients.

2. The method for producing the snack of claim 1, wherein a finished snack includes a density ranging from 0.3 to 2.0 g/cm$^3$.

3. The method for producing the snack of claim 1, wherein the step of compressing the charge of ingredients comprises a pressure ranging from 15 to 100 kg/cm$^2$.

4. The method for producing the snack of claim 1, wherein the steps of compressing the charge of ingredients and energizing the ultrasonic horn comprises a process load range of 0.004 kWh/kg to 0.027 KWh/kg.

5. The method for producing the snack of claim 1, wherein the method includes an energy level ranging from 15 J/g to 100 J/g.

6. The method for producing the snack of claim 1, wherein the ultrasonic horn is energized for a dwell time of 100 milliseconds to 750 milliseconds and at a frequency of 15 Hz to 40 kHz.

7. The method for producing the snack of claim 1, wherein the anvil plug of the anvil includes a forming surface comprising at least one of flat, convex and concave shape.

8. The method for producing the snack of claim 1, wherein the face of the ultrasonic horn includes a horn forming surface comprising at least one of flat, convex and concave shape.

9. The method for producing the snack of claim 1, wherein at least one of the anvil plug of the anvil and the face of the ultrasonic horn include a relief for applying surface details to the snack.

10. The method for producing the snack of claim 1, wherein the sleeve is selected from a plurality of sleeve, each sleeve of the plurality of sleeves having a different volume for producing different sizes of the snack.

11. The method for producing the snack of claim 1, wherein the ingredient includes a functional ingredient, the functional ingredient comprising at least one of a probiotic, an amino acid, a fiber, an antioxidant, a herbal supplement.

12. A method for producing a snack comprising:
supplying a combination of wet and dry ingredients having a variety of particulate forms and sizes, wherein the combination of wet and dry ingredients does not include grain;
mixing the ingredients to a homogeneous blend to a non-cohesive loose mix of ingredients with a moisture level of 6 to 20% by weight;
depositing a metered amount of a charge of the homogeneous blend into a sleeve including a forming chamber;
compressing the charge between an anvil plug and an ultrasonic horn with a pressure ranging from 15 to 100 kg/cm$^2$ by means of an actuator; and
energizing the ultrasonic horn to cause the charge to be agglomerated into a desired shape having a different texture and hardness from the homogeneous blend, wherein a finished snack has a density ranging from 0.3 to 2.0 g/cm$^3$.

13. The method for producing the snack of claim 12, wherein the ultrasonic horn is energized for a dwell time of 100 milliseconds to 750 milliseconds and at a frequency of 15 Hz to 40 kHz.

14. The method for producing the snack of claim 12, wherein at least one of the anvil and the ultrasonic horn includes a forming surface for forming a three dimensional shape.

15. A method for producing a snack comprising:
supplying a combination of ingredients having a variety of particulate forms and sizes, wherein the combination of ingredients does not include grain;
mixing the ingredients with a fluid to coat the surface of the various ingredients to a desired moisture level of 6 to 15% by weight and to a homogeneous blend having a first hardness and texture, wherein the fluid comprises at least one of water, a sugar solution, a fruit juice, and glycerin;
depositing a metered amount of a charge of the homogeneous blend into a sleeve including a forming chamber;
compressing the charge of ingredients between an anvil and an ultrasonic horn by means of an actuator; and
energizing the ultrasonic horn to cause the charge to be agglomerated into a desired shape having a second hardness and texture different from the first hardness and texture.

16. The method for producing the snack of claim 15, wherein the step of compressing the charge of ingredients is to a pressure ranging from 10 to 200 $kg/cm^2$.

17. The method for producing the snack of claim 15, further comprising a step of drying the snack.

18. The method for producing the snack of claim 15, wherein the ultrasonic horn is energized for a dwell time of 100 milliseconds to 750 milliseconds, at a frequency of 15 kHz to 40 kHz and at an amplitude of 15 to 75 micrometers.

* * * * *